UNITED STATES PATENT OFFICE.

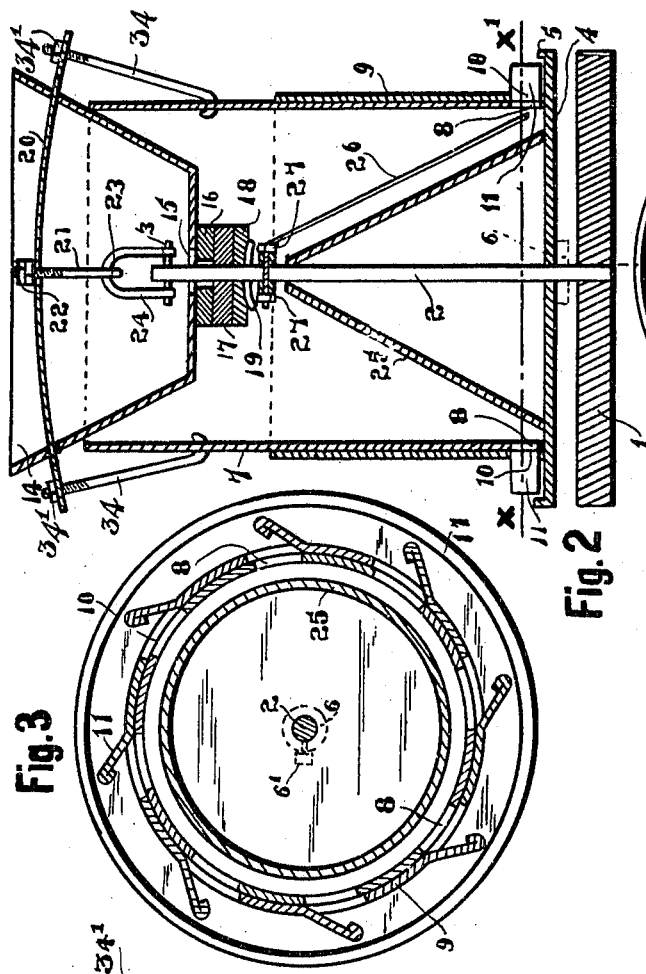

JOHN SIEFFERT, OF WINNIPEGOSIS, MANITOBA, CANADA, ASSIGNOR TO WILLIAM HENRY SIMMONS, OF HUNTER, NORTH DAKOTA.

ADJUSTABLE STOCK POWER GRINDER AND PULPER.

950,518.

Specification of Letters Patent.  Patented Mar. 1, 1910.

Application filed July 13, 1907. Serial No. 383,670.

*To all whom it may concern:*

Be it known that I, JOHN SIEFFERT, of the village of Winnipegosis, in the Province of Manitoba, Canada, have invented certain new and useful Improvements in Adjustable Stock Power Grinders and Pulpers, of which the following is the specification.

My invention relates to machines for grinding and pulping roots, and the object of the invention is to provide a cheap, serviceable device, adapted for both roots and grain, by which the animals when feeding grind or pulp their own food, and it consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawings:—

Figure 1. is a perspective view of my complete invention, parts being broken away for the sake of clearness. Fig. 2 is a vertical sectional view through the center of my device. Fig. 3. is a horizontal sectional view, the section being taken in the plane as denoted by the line X X', Fig. 2. Fig. 4. is a plan view of a modified form of hopper, which is employed. Fig. 5. is a plan view of a pulping plate used with the modified form of hopper. Fig. 6. is a detailed vertical sectional view through the latter hopper and pulping plate, in position on the vertical shaft of the device, the section being taken in the plane as denoted by the line Y Y', Fig. 4.

In the drawings like characters of reference indicate corresponding parts in each figure.

1 is a suitable base of any form, carrying centrally a vertical shaft or spindle 2, having at or near the top a cross arm 3 for a purpose hereinafter explained.

4 is a lower circular feed tray or table having an upturned side or rim as at 5, such tray being rotatable around the shaft, and may be supported by a collar 6, secured to the shaft by a thumb screw 6 or preferably by a set of hooked arms attached to the cylinder on the tray as hereinafter described.

7 is a cylindrical shell or drum constituting a feed receptacle and carried by the tray, such shell or drum being opened at the top and bottom and having a series of similar openings 8 of a triangular outline arranged therearound at or near the bottom.

9 is a cylinder surrounding the above cylinder and having rectangular openings 10 therein at the bottom registering with the opening 8.

11 are propelling wings cut and turned from the material of the cylinder itself, such wings passing obliquely from the base of the cylinder, as clearly shown in Fig. 3. I have found it preferable to form these wings in this wise, but they may be separately attached if desired.

12 are slots in the outer cylinder through which an adjustable screw 13 passes to the inner cylinder. By loosening the screw the outer cylinder can be turned on the inner cylinder and the passages or openings 8 closed to a greater or less extent as will be readily understood.

The wings 11 have their outer tips rounded to present a smooth and harmless edge.

14 is a hopper adapted to rest on the upper edge of the inner cylinder with its bottom within the cylinder.

15 are apertures in the bottom of the hopper through which the material may pass to an upper bur 16 screwed to the hopper bottom.

17 is a lower bur operating in conjunction with the upper bur and fastened on a block of wood 18, which has a cross slot in the lower face for the reception of a pin 19 passing through the shaft, and rigid therewith. The pin is bent as shown in Fig. 2 of the drawing, in order to allow the bur to oscillate slightly so that small stones or harmful foreign matter in the grain may pass through without injury to the burs, which control the supply of feed to the rotary cylinder or receptacle and the annular feed tray.

20 is a flat cross spring supported within the hopper passing freely through its sides.

21 is a bolt passing centrally through the spring and having thereon at the upper end, nuts 22, and at the lower end an eye 23 to receive a U-shaped arm 24 passing downwardly, and secured to the cross rod 3 on the shaft. The tension spring is provided in order that the surface pressure on the burs may be adjusted, such being done by screwing down the nuts 23 thereby pressing the upper bur on the lower.

34 are hooked arms, having their upper ends threaded to receive a nut 34', and are provided to inter-connect the ends of the spring 20 with the sides of the shells 7. This is done simply by passing the hooked end of the arm through an opening in the shell, and the threaded end through a hole in the end of the spring, and then screwing up the nut. The advantage gained in using these arm side connections is two fold, as they prevent the hopper from turning on the shell 7, and further hold the tray and shell clear of the base, when no shoulder 6 is used. This as before suggested is the preferable way for supporting the tray and cylinder, as the whole weight of the grain being ground is directly carried by the bur wheels. By adjusting the nuts on the arms the tray can be raised or lowered above the base.

25 is a deflector or cone arranged around the shaft and within the cylinder resting on the tray 4.

26 is an agitator or rod having its upper end passing through the shaft and the body extending downwardly over the central cone. The rod is adjustable out and in from the shaft by two nuts 27, one at either side of the shaft, and by unscrewing one nut and screwing up the other the position of the agitator from the face of the cone is determined.

In using the above described device the grain is placed in the hopper, there having been previously some grain thrown to the bottom of the cylinder near the openings. The reason for putting the grain primarily in the cylinder is so that animals will have, at the onset, a certain amount of grain to feed from, and when eating the food from the openings 10, as the amount distributed on the tray decreases the tendency is for them to strive to get more. In doing this both the cylinders are rotated by their effort on the wings, and this same movement grinds the grain falling on the burs. In this manner as long as they feed the cylinders are continuously rotated, and consequently the animals grind their own food.

I have found that the device is particularly adapted to the feeding of hogs, as their rooting propensities are especially strong.

In connection with the device I supply a second attachment especially designed for the grinding and pulping of roots. This second attachment I have shown in the drawings in Figs. 4, 5 and 6, and will now proceed to describe. 28 is a hopper of practically the same form as 14 save that it is completely open at the bottom. 29 is a cross bar supported within the hopper, having an opening 30 centrally therethrough and carrying downwardly extending cross knives or blades 31, one at either side of the center. 32 is a circular plate having perforations 32' with cutting edges or points more or less in the form of a sieve or grater. The bottom of the hopper rests on the circular plate and in this position the knives 31 just clear the grating projections. 33 is a sleeve passing centrally through the plate 32 and adapted to fit the shaft 2. The lower end of the sleeve is cut away to receive the cross pin 19, and the upper end passes through the opening 30 in the cross bar, in this wise centering the bar.

To use the attachment the burs and the hopper are removed and the circular plate is placed in practically the same position as the burs occupied, and the hopper 28 is placed over the plate and retained thereon by the cross spring 20, in the same manner as the other hopper. In operation the roots are placed in the hopper and its rotation causes the roots to be scraped over the grating plate, the knives forcing them against the plate. The grated material passes through the apertures 32 and is fed to the animals in a like manner as hereinbefore described.

I have found in actual operation very little effort is required on the part of the stock to revolve the feeder, and that the stock take their food slower than when feeding from troughs, still getting all they require, with little chance for waste.

What I claim as my invention is:

1. A machine for grinding feed comprising a hopper, deflecting means, a stationary base, a tray, means for rotatably mounting the tray on the base, a cylinder supported in said tray and having openings therein leading to the tray, and means on the cylinder engageable by an animal when feeding from the tray, whereby the cylinder is rotated, and grinding means operated by the rotation of the said cylinder.

2. In a device of the class described the combination with the supporting base, of a rotatable tray, a shaft connecting the tray with the base, a cylinder having a series of openings at its lower end and secured to the tray, an outer cylinder having a series of openings registering with the openings of the inner cylinder and carrying extending wings, a conical deflector beneath the hopper, and means operated by the movement of the cylinder for grinding the material contained in the hopper, as and for the purpose specified.

3. In a device of the class described, the combination with the supporting base, of a vertical shaft, a tray rotatable on the shaft, a cylinder secured on the tray, the said cylinder having a series of openings at the lower end, an outer cylinder enveloping the lower portion of the aforesaid cylinder and having a series of rectangular openings adapted to register with the openings in the latter cylinder, said outer cylinder being provided with wings extending from one side of the openings, means for adjusting the outer cylinder in respect to the inner cylinder, a hopper carried at the upper open end of the inner cylinder, grinding means operated by the rotation of the cylinder, and means whereby the tray may be held clear of the base, as and for the purpose specified.

4. In a device of the class described, the combination with the supporting base, of a central vertical shaft fastened within the base, a circular tray rotatable around the shaft, an inner cylinder secured to the tray and having a series of openings at its lower end, an outer cylinder having a series of rectangular openings, adapted to register with the aforesaid openings, wings on the side of the openings, means for adjusting the outer cylinder extending from the inner, a hopper carried by the inner cylinder, at the top, and opening into the cylinder, grinding means operated by the rotation of the cylinder, a conical deflector supported by the tray, an adjustable agitator carried by the shaft, a flat spring bearing within the sides of the hopper, means connecting the spring with the inner end of the shaft, and adjustable means interconnecting the sides of the inner cylinder with the extending ends of the cross spring, whereby the tray may be raised clear of the base, as and for the purpose specified.

5. In a device of the class described, the combination with the supporting base, of a stationary vertical shaft secured in the base, a tray rotatable around the shaft, an inner cylinder secured to the tray and having a series of openings therein at the lower end, an outer cylinder having a series of openings to register with the lower openings, and outwardly extending wings at one side of each opening, adjusting means connecting the cylinders, a hopper opening to the inner cylinder and carried at the upper end thereof, a deflector within the cylinder, an agitator on the shaft, and means, due to the rotation of the cylinder, whereby the material supplied to the hopper is passed to the deflector in a divided state suitable for feeding, as and for the purpose specified.

6. In a device of the class described, the combination with the supporting base, of a central vertical shaft fastened within the base, a circular tray rotatable around the shaft, an inner cylinder secured to the tray and having a series of openings at its lower end, an outer cylinder having a series of openings, adapted to register with the aforesaid openings, outwardly extending wings secured to one side of each opening, means for adjusting the outer cylinder on the inner, a hopper carried by the inner cylinder, at the top, and opening into the cylinder, grinding means operated by the rotation of the cylinder, a conical deflector supported by the tray, an adjustable agitator carried by the shaft, a flat spring bearing within the sides of the hopper, means connecting the spring with the upper end of the shaft, and hooked rods passing between the inner cylinder and the extending ends of the cross spring, said rods being provided with threaded ends and nuts to allow for adjustment, as and for the purpose specified.

7. In a grinding mill, the combination of a grinding device, a feed tray arranged to receive material reduced by the grinding device, and means located at the tray operatively connected with the grinding device and adapted to be operated by an animal feeding from the tray to actuate said grinding device.

8. In a grinding mill, the combination of a hopper, a grinding device connecting with the discharge thereof, a feed tray arranged to receive material reduced by the grinding device, a cylinder supported above the tray and having openings leading thereto, said grinding device discharging inside the cylinder, and means located at the tray and operatively connected with the grinding device and adapted to be operated by an animal feeding from the tray to actuate said grinding device.

9. In a grinding mill, the combination of a hopper, a grinding device connecting with the discharge or outlet thereof, a feed tray arranged to receive material reduced by the grinding device, a cylinder supported by the tray, a conical deflector mounted within the cylinder to direct the material from the grinding device to the tray, and means located at the tray and operatively connected with the grinding device and adapted to be operated by an animal feeding from the tray to actuate said grinding device.

10. The combination with a rotary feed receptacle having a hopper at its upper end and outwardly projecting propelling wings and feed discharge openings or passages, of a pair of coöperating burs controlling the supply of feed to the said rotary receptacle, an annular feed tray located immediately below and adapted to receive feed from said discharge passages or openings, and means whereby rotation of the feed receptacle causes relative rotary movement of the said burs.

11. In a machine of the class described, the combination with a rotary feed drum, and a feed table, the former having passages for delivering the feed onto the projecting portion of the latter, of a pair of burs controlling the supply of feed to the said drum, and one of which burs is movable with the drum, means for vertically adjusting one bur with respect to the other bur, and propelling wings on said drum adjacent to the projecting portion of said feed table and to the feed discharge passages or openings in said drum.

12. In a machine of the class described, the combination with an upright shaft or spindle, and a feed receptacle mounted to rotate around the same, said feed receptacle having a projecting feed tray and feed discharge passages above said tray, of a pair of coöperating burs, one of which is connected to rotate with said receptacle, and the other of which is independently supported, and means for adjustably setting said burs with respect to each other.

Signed at Winnipeg, this 15th day of May, 1907.

JOHN SIEFFERT.

Witnesses:
M. A. SOMERVILLE,
G. S. ROXBURGH.